(12) United States Patent  
Arakawa et al.

(10) Patent No.: US 9,199,411 B2  
(45) Date of Patent: Dec. 1, 2015

(54) METHOD OF CONNECTING MULTI-CORE FIBERS

(71) Applicant: FUJIKURA LTD., Tokyo (JP)

(72) Inventors: Yoko Arakawa, Sakura (JP); Katsuhiro Takenaga, Sakura (JP); Shoichiro Matsuo, Sakura (JP)

(73) Assignee: FUJIKURA LTD., Tokyo (JP)

( * ) Notice: Subject to any disclaimer, the term of this patent is extended or adjusted under 35 U.S.C. 154(b) by 3 days.

(21) Appl. No.: 13/782,133

(22) Filed: Mar. 1, 2013

(65) Prior Publication Data

US 2013/0312899 A1 Nov. 28, 2013

(30) Foreign Application Priority Data

Mar. 2, 2012 (JP) ................................. 2012-046179  
Dec. 6, 2012 (JP) ................................. 2012-267448

(51) Int. Cl.
| | |
|---|---|
| *B65H 69/06* | (2006.01) |
| *B29C 65/02* | (2006.01) |
| *G02B 6/02* | (2006.01) |
| *G02B 6/255* | (2006.01) |

(52) U.S. Cl.  
CPC ............ *B29C 65/02* (2013.01); *G02B 6/02042* (2013.01); *G02B 6/2551* (2013.01)

(58) Field of Classification Search  
CPC .................... A61B 2010/045; A61B 2017/003; A61B 2017/00699; A61B 2018/00011; A61B 2018/00029; A61B 2018/00791; A61B 2018/2244; A61B 2019/505; A61B 2019/507; A61B 2503/20; A61B 2505/07; A61B 2562/146; A61B 5/0044; A61B 5/0091; A61B 5/015; A61B 5/02007; A61B 5/0536; A61B 5/06; A61B 5/1073; A61B 5/1126; A61B 5/1128; G02B 6/02042; G02B 6/2551; B29C 65/02  
USPC ................ 156/158, 157, 304.1, 272.2, 273.1, 156/274.6, 258, 150, 272.6; 385/96, 97, 98  
See application file for complete search history.

(56) References Cited

U.S. PATENT DOCUMENTS

| | | | | |
|---|---|---|---|---|
| 5,222,172 | A * | 6/1993 | Suzuki ............................ | 385/96 |
| 6,799,903 | B2 * | 10/2004 | Saito et al. ..................... | 385/96 |
| 2003/0007755 | A1 * | 1/2003 | Morita et al. .................. | 385/96 |
| 2003/0056547 | A1 * | 3/2003 | Yamada et al. ................. | 65/407 |

FOREIGN PATENT DOCUMENTS

JP  2008-003170 A  1/2008

* cited by examiner

*Primary Examiner* — Jacob T Minskey  
*Assistant Examiner* — Vishal I Patel  
(74) *Attorney, Agent, or Firm* — Westerman, Hattori, Daniels & Adrian, LLP

(57) ABSTRACT

A butting step S1 of butting end surfaces of multi-core fibers against each other by aligning central axes CA of clads 20 of the multi-core fibers to cause each core 11 of one multi-core fiber 1*a* and each core 11 of the other multi-core fiber 1*b* to face each other, and a fusing step S2 of fusing the multi-core fibers to each other by carrying out discharge by a pair of discharge electrodes 50*a* and 50*b* that sandwich a butted position of the multi-core fibers and face each other are provided. The fusing step S2 causes tips 51*a* and 51*b* of the discharge electrodes to perform reciprocating motion such that a straight line SL that connects the tips 51*a* and 51*b* of the discharge electrodes moves while describing a surface perpendicular to the central axes CA.

10 Claims, 5 Drawing Sheets

METHOD OF CONNECTING MULTI-CORE FIBERS

TECHNICAL FIELD

The present invention relates to a method of connecting multi-core fibers capable of suppressing dispersion of connection losses of cores and of connecting a plurality of multi-core fibers.

BACKGROUND ART

In recent years, the amount of transferred information has been dramatically increased with the spread of an optical fiber communication system. With the increase of the amount of transferred information, high-capacity long-distance optical communication is performed using a large number of optical fibers such as a dozen or a hundred of optical fibers in the optical fiber communication system.

To increase a transmission capacity per one optical fiber in such an optical fiber communication system, it is known that a multi-core fiber in which outer peripheries of a plurality of cores are covered with a single clad is used and a plurality of signals is transferred by light propagating in each of the cores. Also, in the optical fiber communication system, there is a case where a plurality of optical fibers is connected and used when the long-distance optical communication is performed. There is also a case where a plurality of multi-core fibers is connected and used when a multi-core fiber is used.

In connecting optical fibers, end surfaces of respective optical fibers are sometimes butted against each other using discharge welding. In discharge welding, usually, a portion to be welded, which the end surfaces of the optical fibers to be connected are butted against each other, is arranged between a pair of electrodes, and discharge is carried out between the pair of electrodes, so that the end surfaces of the optical fibers are fused (see Patent Document 1). Even in a case where the multi-core fibers are connected, positions of cores of the multi-core fibers to be connected are adjusted, so that the end surfaces of the multi-core fibers may sometimes be fused by discharge welding.

[Patent Document 1] Japanese Patent Application Laid-Open No. 2008-3170

SUMMARY OF INVENTION

However, the inventors found out that, when the multi-core fibers are connected to each other by fusion of discharge, there is a case where dispersion may be caused in losses due to connection of the light propagating in the cores.

Therefore, an object of the present invention is to provide a method of connecting multi-core fibers capable of suppressing dispersion of connection losses of cores and of connecting a plurality of multi-core fibers.

The inventors of the present invention diligently studied the cause of the dispersion of the connection losses of the cores when the multi-core fibers are connected to each other by fusion of discharge. As a result, the inventors came to a conclusion that, when the multi-core fibers are fused by discharge, a temperature distribution is caused within a fused surface, the degree of connection between the cores varies depending on each core, and this results in the dispersion of the connection losses of the cores. Therefore, the inventors further diligently studied, and have led to the present invention.

That is, the present invention provides a method of connecting a pair of multi-core fibers, the method including: a butting step of butting end surfaces of the multi-core fibers against each other by aligning central axes of clads of the multi-core fibers with each other to cause each core of one of the multi-core fibers and each core of the other of the multi-core fibers to face each other; and a fusing step of fusing the multi-core fibers to each other by carrying out discharge by a pair of discharge electrodes sandwiching a butted position of the multi-core fibers and facing each other, wherein, in the fusing step, tips of the discharge electrodes are moved to cause a straight line connecting the tips of the discharge electrodes to move while describing a surface perpendicular to the central axes.

According to such a method of connecting multi-core fibers, distribution of energy due to the discharge moves to describe a surface by tips of the discharged electrodes moving during the fusion. Therefore, it can be suppressed that heat due to the discharge is concentrated into a part of end surfaces of the multi-core fibers to be fused, compared with a case where positions of the discharge electrodes are fixed during the fusion. Therefore, it can be suppressed that a fused state between some cores becomes satisfactory and a fused state between the other cores becomes less satisfactory than the fused state between the some cores. In this way, the dispersion of the connection losses of the cores can be suppressed by suppressing the dispersion of the fused states of the cores.

Note that, before a fusing step, the end surfaces of the multi-core fibers that are butted against each other may be contacted with or may not be contacted with each other as long as the fusion can be performed in the fusing step.

Further, the tips of the discharge electrodes may perform reciprocating motion. For example, the tips of the discharge electrodes can be reciprocated by vibrating the tips of the discharge electrodes.

Further, it is favorable that the surface described by the movement of the straight line covers the end surfaces when the end surfaces of the multi-core fibers are planarly viewed.

The entire end surfaces of the multi-core fibers are heated and the dispersion of the fused states of the cores can be further suppressed by a large width of the reciprocating motion of the tips of the discharge electrodes.

Further, it is favorable that strength of the discharge varies in accordance with positions of the tips of the pair of discharge electrodes.

The distribution of the energy of the discharge given to the fused surfaces of the multi-core fibers can be adjusted by the discharge strength varying in accordance with the positions of the tips of the discharge electrodes. For example, in a case where the energy of the discharge is not uniformly transferred to the fused surfaces of the multi-core fibers entirely due to an external factor, it can be adjusted such that the energy of the discharge can be uniformly transferred to the fused surfaces of the multi-core fibers entirely.

Furthermore, it is favorable that the multi-core fibers are arranged to cause the central axes to be horizontal, and the discharge electrodes are arranged to cause the straight line to be horizontal, and the strength of the discharge is maximized with the tips of the discharge electrodes lying at a lower side than the central axes.

When optical fibers are connected to each other, it is favorable to butt the optical fibers against each other such that central axes of the optical fibers become horizontal from the perspective of easy operation. In this case, it is favorable to arrange the tips of the discharge electrodes in the horizontal direction while sandwiching a butted position of the multi-core fibers, and to carry out the discharge in the horizontal direction from the perspective of easy configuration of a fusion device. However, if the discharge is carried out in the horizontal direction, an upward current due to heat of the discharge is caused, and the temperature of an upside tends to be higher than that of a downside based on a discharged position. Therefore, as described above, uneven distribution of heat on a fused surface can be suppressed by controlling the discharge such that the position where the discharge strength is maximized lies at a lower side than the central axes of the multi-core fibers. Therefore, the dispersion of the fused states of the cores can be further suppressed. Note that, in this case, the tips of the pair of discharge electrodes are vertically reciprocated.

Further, it is favorable that the strength of the discharge is maximized at a position where the straight line does not intersect with any of the cores when the end surfaces of the multi-core fibers are planarly viewed.

According to such a method of connecting multi-core fibers, an excessive increase in temperature of a specific core can be suppressed by not carrying out the discharge having the maximum strength at a position where the cores are arranged. Therefore, deformation of a specific core compared with other cores or diffusion of a dopant to be added to a specific core compared with other cores can be suppressed. Therefore, the dispersion of the fused states or refractive indices of the cores can be further suppressed.

Furthermore, it is favorable that each of the multi-core fibers includes: a plurality of first clads surrounding an outer peripheral surface of each of the cores; and a plurality of second clads surrounding an outer peripheral surface of each of the first clads and having an outer peripheral surface surrounded by the clad, and each of the multi-core fibers satisfies all of the following formulas:

$$n_1 > n_2 > n_3$$

$$n_1 > n_4$$

$$n_3 < n_4$$

where refractive index of the cores is $n_1$, refractive index of the first clads is $n_2$, refractive index of the second clads is $n_3$, and refractive index of the clad is $n_4$, and the strength of the discharge is maximized at a position where the straight line does not intersect with any of the second clads when the end surfaces of the multi-core fibers are planarly viewed.

Since such a multi-core fiber has the second clad with the minimum refractive index $n_3$, a trench structure is formed by the second clad from the perspective of the refractive index. The light propagating through a core is strongly confined in the core due to this trench structure. In a multi-core fiber including such a trench structure, deformation of a specific second clad or a change of the refractive index of a specific second clad can be suppressed by not carrying out the discharge having the maximum strength at a position where the second clad is arranged. Therefore, dispersion of confinement effect of light of the cores in a connected portion of the multi-core fibers can be further suppressed.

As described above, according to the present invention, a method of connecting multi-core fibers that is capable of suppressing dispersion of connection losses of cores and of connecting a plurality of multi-core fibers is provided.

EMBODIMENT OF THE INVENTION

Hereinafter, a preferred embodiment of a multi-core fiber according to the present invention will be described with reference to the drawings. Note that, for easy understanding, the scale shown in each drawing may be different from the scale described below.

First Embodiment

Figure 1:
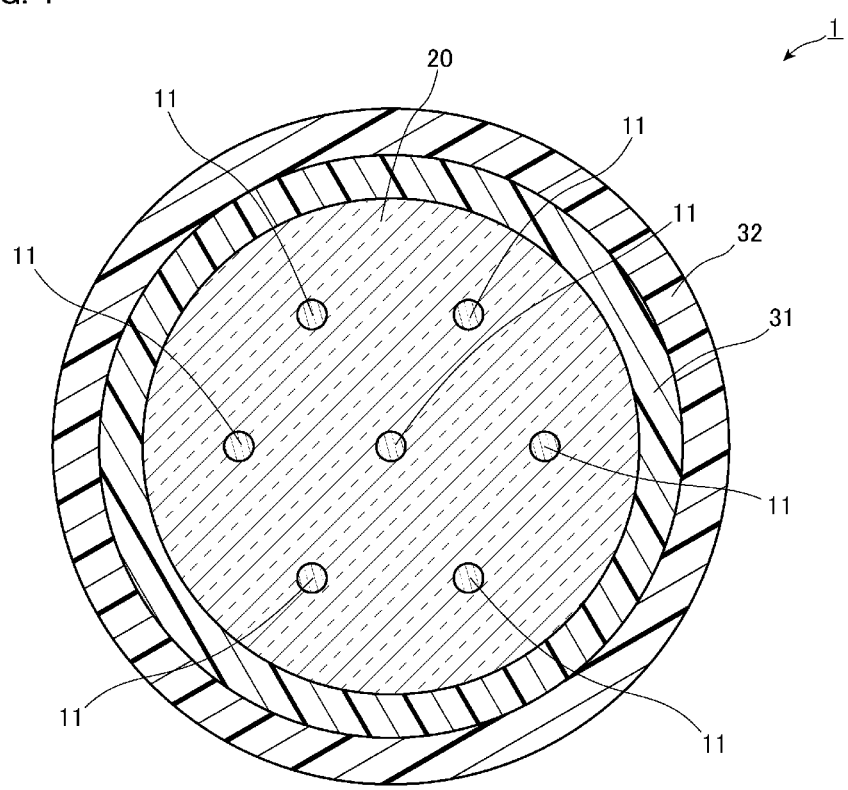
FIG. 1 is a cross-sectional view illustrating a multi-core fiber connected in a first embodiment of the present invention.

FIG. 1 is a cross-sectional view illustrating a multi-core fiber according to an embodiment of the present invention. As illustrated in FIG. 1, a multi-core fiber 1 of the present embodiment includes a plurality of cores 11, a clad 20 that surrounds the cores 11 and respective outer peripheral surfaces of the cores 11, an inner side protective layer 31 that covers an outer peripheral surface of the clad 20, and an outer side protective layer 32 that covers an outer peripheral surface of the inner side protective layer 31.

In the present embodiment, the number of the cores 11 is seven, and one core 11 is arranged in a center and the other six cores 11 are arranged at an outer periphery side at even intervals. That is, 1 to 6 cores 11 are arranged. In this way, the plurality of cores 11 is arranged in a triangular lattice. The plurality of cores 11 arranged in such a manner is symmetrical about a central axis of the clad 20.

The size of each member that constitutes the multi-core fiber 1 is not especially limited. However, the diameters of the cores 11 are, for example, 10 μm. Note that the diameters of the cores 11 may be equal to each other. However, the diameters of the cores 11 arranged next to each other may be different by about 1.0 to 2.0%, for example. In this way, even if the diameters of the cores 11 arranged next to each other are physically slightly different, the diameters of respective cores 11 make little difference for the light propagating through the cores 11, and the cores 11 have approximately equivalent optical properties. Also, the diameter of the clad 20 is, for example, 181 μm. The center to center distance between each two of the cores 11 includes, but is not especially limited to, 43 μm, for example.

Further, the refractive index of each of the cores 11 is higher than that of the clad 20. The core 11 is, for example, made of quartz to which a dopant such as germanium (Ge) that increases the refractive index is added, and in this case, the clad is made of pure quarts, for example. Note that the refractive indices of the cores 11 may be equal to each other. However, the refractive indices of the cores 11 arranged next to each other may be different by about 1.0 to 2.0%. In this way, even if the refractive indices of the cores 11 arranged next to each other are physically slightly different, the refractive indices of respective cores 11 make little difference for the light propagating through the cores 11, and the cores 11 have approximately equivalent optical properties.

In such a multi-core fiber 1, the light propagates through each of the cores 11 in a single mode, for example.

Next, a method of connecting the multi-core fibers 1 to each other will be described. Note that, in this description, multi-core fibers 1a and 1b that have a similar configuration to the multi-core fiber 1 illustrated in FIG. 1 are connected to each other.

Figure 2:
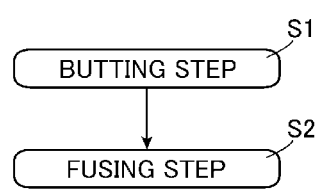
FIG. 2 is a flowchart illustrating a method of connecting the multi-core fibers of FIG. 1 to each other.

FIG. 2 is a flowchart illustrating a method of connecting the multi-core fibers 1 of FIG. 1. As illustrated in FIG. 2, the method of connecting the multi-core fibers 1 includes, as principal steps, a butting step S1 of butting end surfaces of the multi-core fibers 1a and 1b against each other, and a fusing step S2 of fusing the multi-core fibers 1a and 1b, the end surfaces of which have been butted against each other.

<Butting Step S1>

First, the multi-core fibers 1a and 1b that have a similar configuration to the multi-core fiber 1 of FIG. 1 are prepared. Then, the inner side protective layers 31 and the outer side protective layers 32 in the vicinity of end portions to be connected of the multi-core fibers 1a and 1b are peeled off. It is favorable that angles of the end surfaces to be connected of the multi-core fibers 1a and 1b have shifts of one degree or less with respect to surfaces perpendicular to the central axes of the respective clads 20 from the perspective of more appropriate connection when the multi-core fibers 1a and 1b are connected in the fusing step S2. If the end surfaces of the multi-core fibers 1a and 1b are not in a state near perpendicular to the central axes of the clads 20 in the vicinity of the end surfaces, the end surfaces are adjusted to be perpendicular to the central axes of the clads 20 by cutting, polishing, and the like, as needed.

Figure 3A:
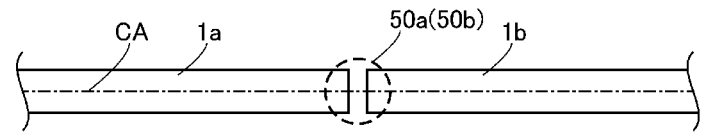
FIG. 3A and FIG. 3B are diagrams illustrating a state after a butting step.
Figure 3B:
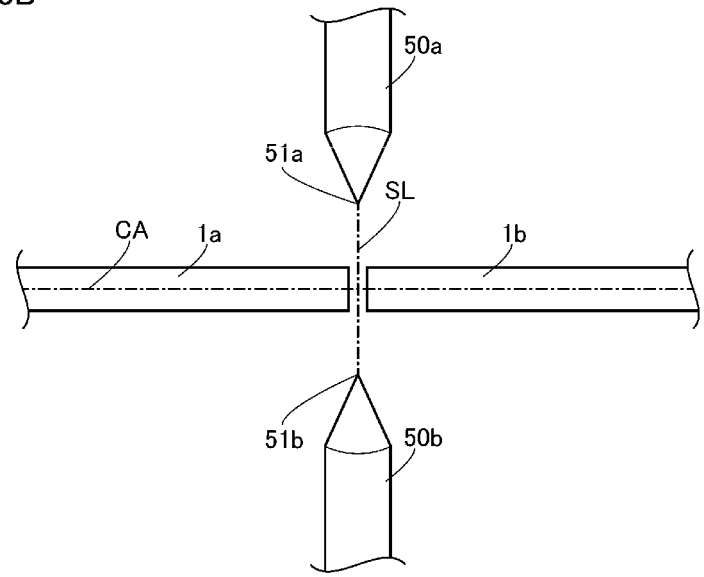

FIGS. 3A and 3B are diagrams illustrating how the multi-core fibers 1a and 1b are set in a fusion device (not illustrated). To be specific, FIG. 3A is a diagram of the multi-core fibers 1a and 1b set in the fusion device as viewed from a horizontal direction and FIG. 3B is a diagram of the multi-core fibers 1a and 1b set in the fusion device as viewed from directly above. Note that, in the present embodiment, the fusion device is a device in which the optical fibers to be connected are horizontally arranged, and is provided with discharge electrodes 50a and 50b having tips, a positional relationship of which is horizontal.

As illustrated in FIGS. 3A and 3B, the multi-core fibers 1a and 1b are set in the fusion device with peeled sides of the inner side protective layers 31 and the outer side protective layers 32, and central axes CA of the clads 20 of the multi-core fibers 1a and 1b are aligned with each other. That is, the multi-core fibers 1a and 1b are arranged such that the central axes CA of the clads 20 of the multi-core fibers 1a and 1b are positioned on the same straight line. The multi-core fibers 1a and 1b at this time are set in the fusion device with the central axes CA being horizontal. Note that a method of aligning the central axes of the multi-core fibers 1a and 1b can be as follows. For example, in a case where the cores 11 are arranged on the central axes of the clads 20 like the present embodiment, central positions of the cores 11 arranged on the respective centers of the clads 20 of the multi-core fibers 1a and 1b may just be aligned with each other. Meanwhile, in a case where the cores 11 are not arranged on the central axes of the clads 20 unlike the present embodiment, outer peripheral surface of the clads 20 of the multi-core fibers are coplanar with each other.

Note that, as illustrated in FIG. 3B, it is favorable that a straight line SL that connects tips 51a and 51b of the pair of discharge electrodes 50a and 50b provided in the fusion device is positioned between the end surfaces to be fused of the multi-core fibers 1a and 1b. Also, it is favorable to satisfy the following formula (1) where the distance between the tips 51a and 51b of the discharge electrodes 50a and 50b is G mm, and the diameter of each of the clad 20 of each of the multi-core fibers 1a and 1b is D μm.

$$\frac{D+99}{140} - 0.5 \leq G \leq \frac{D+99}{140} + 0.5 \quad (1)$$

Further, in this case, it is favorable to satisfy the following formula (2).

$$\frac{D+99}{140} - 0.2 \leq G \leq \frac{D+99}{140} + 0.2 \quad (2)$$

Next, at least one of the multi-core fibers 1a and 1b is rotated around the axis, so that the respective cores 11 of the multi-core fiber 1a and the respective cores 11 of the multi-core fiber 1b face each other. At this time, it is favorable that the angle made by the end surface of the multi-core fiber 1a and the end surface of the multi-core fiber 1b is 0.5 degrees or less from the perspective of more appropriate connection when the multi-core fibers 1a and 1b are connected to each other in the fusing step S2. In a case where the angle made by the end surface of the multi-core fiber 1a and the end surface of the multi-core fiber 1b cannot be 0.5 degrees or less, at least one of the multi-core fibers is rotated, so that the cores 11 can face each other with other combinations of the cores 11, as needed. Alternatively, the angle of the end surfaces is adjusted by cutting or polishing at least one of the multi-core fibers.

In this way, the multi-core fibers 1a and 1b are butted against each other. Note that the end surfaces of the multi-core fibers may be contacted or may not be contacted with each other with the end surfaces of the multi-core fibers 1a and 1b being butted against each other as long as the multi-core fibers 1a and 1b can be fused in the fusing step S2, as described below.

<Fusing Step S2>

Figure 4:
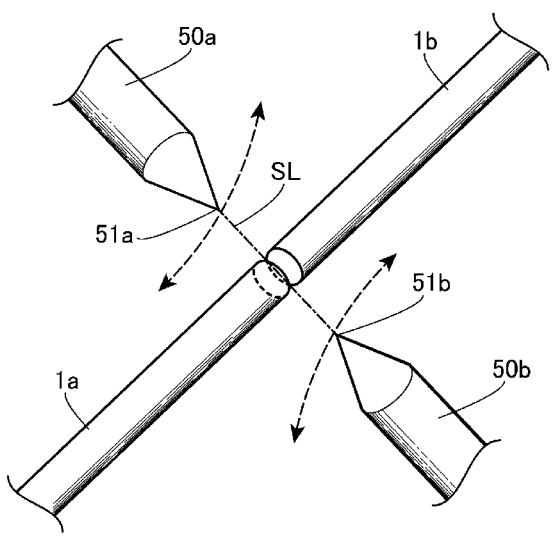
FIG. 4 is a diagram illustrating a state of a fusing step.
Figure 5:
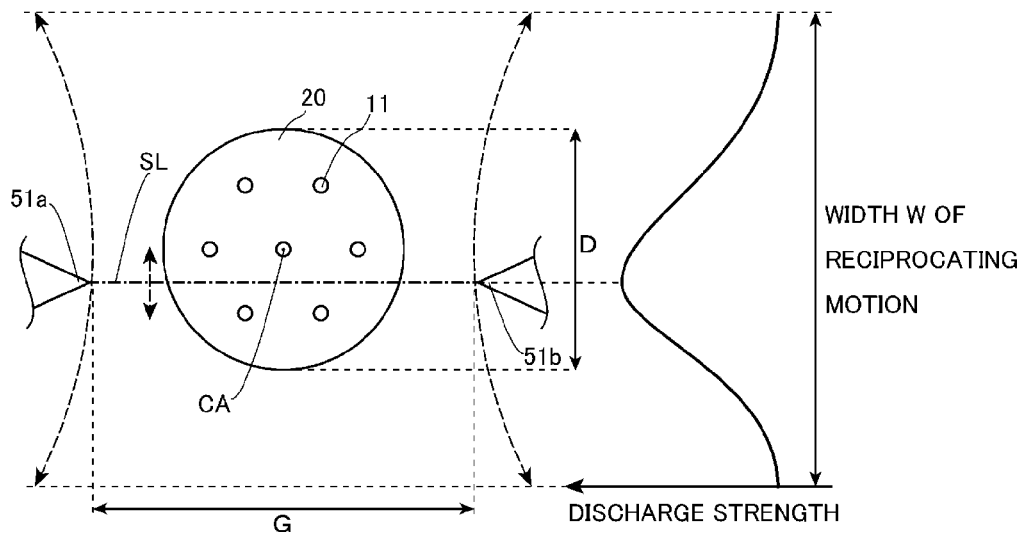
FIG. 5 is a diagram illustrating a relationship between a position of a line connecting tips of discharge electrodes and discharge strength.

FIG. 4 is a diagram illustrating how the fusing step works, and FIG. 5 is a diagram illustrating a relationship between a position of the straight line SL that connects the tips 51a and 51b of the discharge electrodes 50a and 50b and discharge strength. As illustrated in FIG. 4, the discharge electrodes 50a and 50b of the fusion device is repeatedly swung in a vertical direction with the multi-core fibers 1a and 1b being butted against each other. Therefore, the tips 51a and 51b of the discharge electrodes 50a and 50b move and reciprocate while describing an arc in the vertical direction. An example of such reciprocating motion of the tips 51a and 51b includes vibration of the tips 51a and 51b.

The straight line SL that connects the tips 51a and 51b moves while describing a surface perpendicular to the central axes CA of the clads 20 of the multi-core fibers 1a and 1b by the reciprocating motion of the tips 51a and 51b. In other words, the tips 51a and 51b of the discharge electrode 50a and 50b are reciprocated such that the straight line SL that connects the tips 51a and 51b of the discharge electrodes 50a and 50 moves while describing the surface perpendicular to the central axes CA.

At this time, the discharge electrodes 50a and 50b swing in synchronization with each other. Therefore, the tips 51a and 51b are reciprocated while keeping a horizontal relative position. Therefore, the straight line SL that connects the tips 51a and 51b moves in the vertical direction while keeping a horizontal state. The distribution of heat strength due to discharge can be easily grasped by reciprocating the tips 51a and 51b such that the straight line SL moves in the vertical direction while keeping the horizontal state. Therefore, in a case where the discharge strength is changed in accordance with the positions of the tips 51a and 51b as described below, the relationship between the positions of the tips 51a and 51b and the discharge strength can be easily determined.

Also, a midpoint of the width W of the reciprocating motion of each of the tips 51a and 51b is horizontal to the central axis CA of the clad 20. Therefore, a center of the width W of the reciprocating motion of the straight line SL is a line that passes through the central axes CA. Further, the width W of the movement of each of the tips 51a and 51b is larger than the diameter of each of the clads 20 of the multi-core fibers 1a and 1b. That is, the surface described by the movement of the straight line SL covers the end surfaces when the end surfaces of the multi-core fibers 1a and 1b are planarly viewed. In this case, the width W is favorably 1.2 to 1.8 times the diameter D of the clad 20, and is more favorably 1.4 to 1.6 times the diameter D.

Then, a high voltage is applied to the pair of discharge electrodes 50a and 50b and discharge is carried out with the tips 51a and 51b of the discharge electrodes 50a and 50b being reciprocated in the vertical direction.

At this time, in the present embodiment, the discharge strength is controlled to change in accordance with the positions of the tips 51a and 51b of the discharge electrodes 50a and 50b as illustrated in FIG. 5. This discharge strength is controlled to be maximized with the straight line SL that connects the tips 51a and 51b lying at a lower side than the central axis CA of the clad 20 of the multi-core fiber 1b. To be specific, a position at which the discharge strength is maximized is favorably positioned below the central axis and between the central axis CA and 0.4D where the diameter of the clad 20 is D, and is more favorably positioned below the central axis CA between 0.15D and 0.3D. Also, the discharge strength is favorably maximized at a position where the straight line SL that connects the tips 51a and 51b does not intersect with any of the cores 11 of the multi-core fiber 1b when the end surface of the multi-core fiber 1b is planarly viewed as illustrated in FIG. 5. Therefore, the discharge strength is favorably maximized at a position lower than the central axis between the central axis CA and the 0.4D, and where no core 11 is arranged. More favorably, the strength of the discharge is maximized at a position below the central axis CA between 0.15D and 0.3D and where no core 11 is arranged. Note that this positional relationship is similar in either case where the end surface of the multi-core fiber 1a is planarly viewed and the end surface of the multi-core fiber 1b is planarly viewed.

In this way, energy of the discharge is converted into heat by the discharge from the discharge electrodes 50a and 50b, the end surfaces of the multi-core fibers 1a and 1b that are butted against each other are fused, and the cores 11 of the multi-core fiber 1a and the cores 11 of the multi-core fiber 1b are respectively optically joined.

As described above, according to the method of connecting the multi-core fibers 1a and 1b of the present embodiment, distribution of the energy by the discharge moves to describe a surface by carrying out the discharge between the tips 51a and 51b with the tips 51a and 51b of the discharge electrodes 50a and 50b being reciprocated in the vertical direction. Therefore, it can be suppressed that the heat due to the discharge is concentrated into a part of the multi-core fibers 1a and 1b in a radial direction during the fusion, compared with a case where the positions of the discharge electrodes are fixed. Therefore, it can be suppressed that a fused state between some cores becomes satisfactory and a fused state between the other cores becomes less satisfactory than the fused state between the some cores. Therefore, dispersion of connection losses of the cores 11 can be suppressed.

Also, like the present embodiment, the energy by the discharge is distributed to the end surfaces of the multi-core fibers 1a and 1b entirely and the end surfaces of the multi-core fibers 1a and 1b are heated entirely by the width of the movement of each of the tips 51a and 51b being larger than the diameter of each of the multi-core fibers 1a and 1b, and by the surface described by the movement of the straight line SL covering the end surfaces of the multi-core fibers 1a and 1b. Therefore, the multi-core fibers 1a and 1b can be more properly fused.

Also, in the present embodiment, the discharge strength varies in accordance with to the positions of the tips 51a and 51b of the discharge electrodes 50a and 50b. Therefore, the distribution of the energy by the discharge given to fused surfaces of the multi-core fibers 1a and 1b can be adjusted. Especially, in a case where the multi-core fibers 1a and 1b are horizontally arranged, and the positional relationship between the tips 51a and 51b of the discharge electrodes 50a and 50b is horizontal like the present embodiment, an upward current due to the heat by the discharge is caused, and the temperature of an upside tends to be higher than that of a downside based on a discharged position. Therefore, like the present embodiment, uneven distribution of the heat on the fused surface can be suppressed by controlling the discharge strength such that the tips 51a and 51b of the discharge electrodes 50a and 50b lie at a lower side than the central axes CA of the multi-core fibers 1a and 1b. The dispersion of the fused states of the cores 11 can be further suppressed by controlling the discharge strength in this way, compared with a case where the discharge is carried out with constant strength.

Also, in the present embodiment, when the end surfaces of the multi-core fibers 1a and 1b are planarly viewed, the discharge strength is maximized at a position where the straight line SL that connects the tips 51a and 51b does not intersect with any of the cores 11. That is, the discharge is not carried out at the position where the cores 11 are arranged. Therefore, according to the method of connecting the multi-core fibers 1a and 1b of the present embodiment, it can be suppressed that the temperature of a specific core is excessively increased. Therefore, deformation of a specific core or diffusion of a dopant to be added to a specific core can be suppressed. Therefore, the dispersion of the fused states of the cores can be further suppressed.

Figure 6:
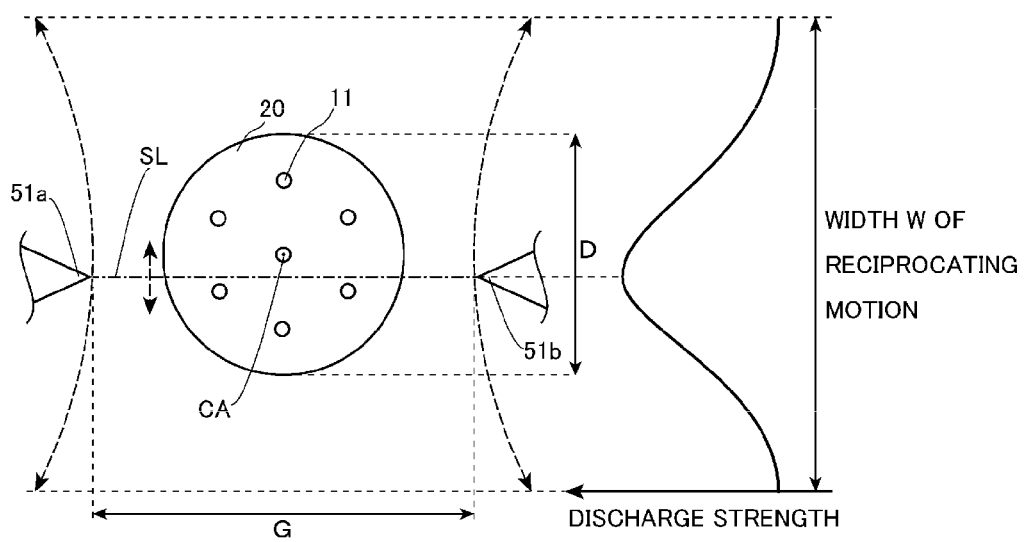
FIG. 6 is a diagram illustrating a modification of the first embodiment.

Note that, in the present embodiment, the multi-core fibers 1a and 1b are arranged with a longitudinal direction thereof being horizontal such that a pair of cores 11 at an outer periphery side is horizontally arranged while sandwiching the core 11 arranged in the center of the clad 20 in the fusing step S2. However, the multi-core fibers 1a and 1b may be arranged as follows. FIG. 6 is a diagram illustrating a modification of the first embodiment. As illustrated in FIG. 6, the multi-core fibers 1a and 1b are arranged with the longitudinal direction thereof being horizontal such that a pair of cores 11 at the outer periphery side is arranged in a vertical direction while sandwiching the core 11 arranged at the center of the clad 20. Even in this case, the discharge strength is favorably maximized with the straight line SL that connects the tips 51a and 51b lying at a lower side than the central axes CA of the clad 20 of the multi-core fiber 1b, and is more favorably maximized at a position where the straight line SL does not intersect with any of the cores 11 of the multi-core fibers 1a and 1b when the end surfaces of the multi-core fibers 1a and 1b are plarnarly viewed.

Also, the multi-core fibers 1a and 1b may be rotated and arranged around the central axis CA with other angle as long as the cores 11 of the multi-core fibers 1a and 1b face each other. In this way, freedom of setting the relative relationship between the position where the power is maximized and the position of each of cores 11 can be further enhanced by arranging the multi-core fibers 1a and 1b around the central axes CA with a desired angle in the fusing step S2.

Second Embodiment

Next, a second embodiment of the present invention will be described with reference to FIG. 7. Note that configuration elements equivalent or similar to those of the first embodiment are provided with the same reference signs unless otherwise especially described, and overlapped description is omitted.

Figure 7:
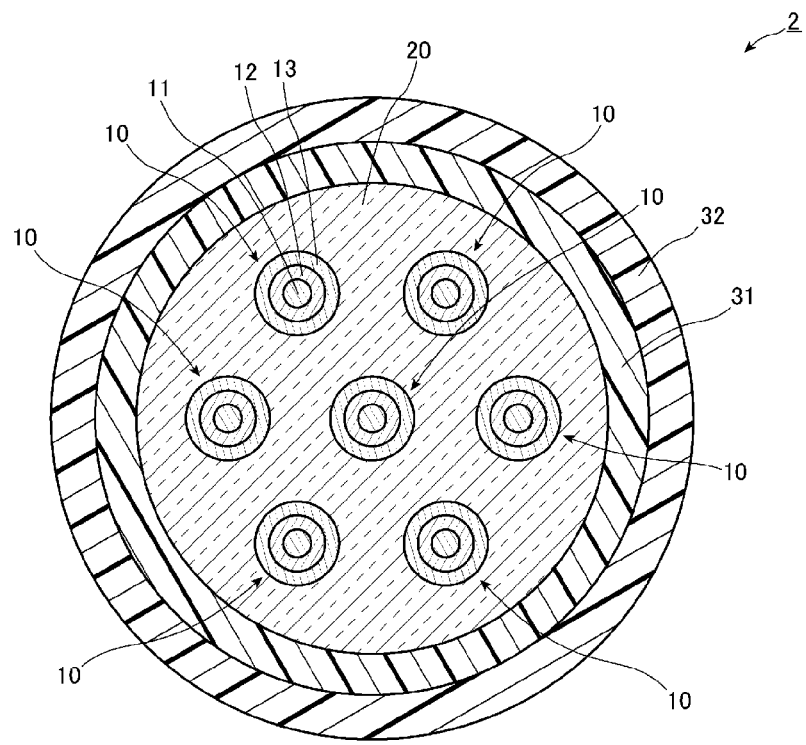
FIG. 7 is a cross-sectional view illustrating a multi-core fiber connected in a second embodiment of the present invention.

FIG. 7 is a cross-sectional view illustrating a multi-core fiber to be connected in the second embodiment of the present invention. As illustrated in FIG. 7, a multi-core fiber 2 of the present embodiment includes a plurality of core elements 10, and is different from the multi-core fiber 1 of the first embodiment in that cores 11 are provided in the respective core elements 10.

Each of the core elements 10 includes a core 11, a first clad 12 that surrounds an outer peripheral surface of the core 11, and a second clad 13 that surrounds an outer peripheral surface of the first clad 12 and an outer peripheral surface of which is surrounded by a clad 20. In the present embodiment, the outer diameters of the first clads 12 are equivalent to each other, and the outer diameters of the second clads 13 are equivalent to each other. Therefore, the thicknesses of the first clads 12 are mutually equivalent, and the thicknesses of the second clads 13 are mutually equivalent. Also, the outer diameter of the first clad 12 includes, but is not especially limited to, 20 µm, for example, and the outer diameter of the second clad 13 includes, but is not especially limited to, 30 µm, for example.

Also, where refractive index of each of the cores 11 is $n_1$, refractive index $n_2$ of the first clad 12 is lower than the refractive index $n_1$ of the core 11, and refractive index $n_3$ of the second clad 13 is further lower than the refractive index $n_2$ of the first clad 12. Also, refractive index $n_4$ of the clad 20 is lower than the refractive index $n_1$ of the core 11 and is higher than the refractive index $n_3$ of the second clad 13. In other words, each of the refractive indices $n_1$ to $n_4$ satisfies all of the following formulas:

$$n_1 > n_2 > n_3$$

$$n_1 > n_4$$

$$n_3 < n_4$$

Therefore, in a case where each of the core elements 10 is viewed from the perspective of the refractive index, each of the core elements 10 has a trench structure.

In this way, confinement effect of light of the core 11 is increased and the light propagating through the cores is prevented from leaking from the respective core elements 10 by causing the refractive index $n_3$ of the second clad 13 to be lower than the refractive index $n_2$ of the first clad 12 and the refractive index $n_4$ of the clad 20. Further, the second clad 13 and the clad 20 having low refractive indices pose an impediment, and further prevent a stroke of the cores 11 arranged next to each other.

To connect the multi-core fibers 2 having such a trench structure, steps may be performed as follows. First, a butting step S1 is performed in a similar manner to the butting step S1 of the first embodiment.

Figure 8:
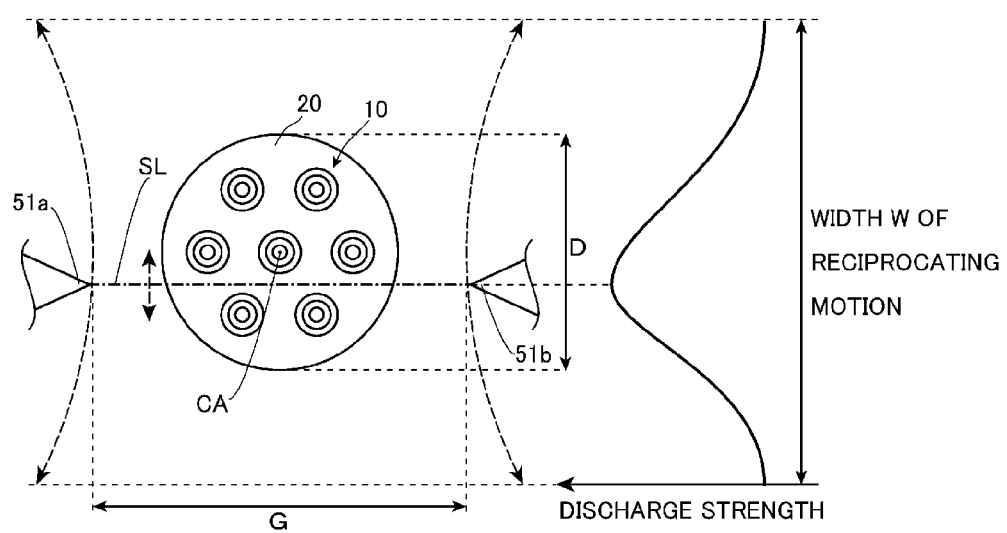
FIG. 8 is a diagram illustrating a relationship between a position of a line connecting tips of discharge electrodes and discharge strength in the second embodiment.

Next, a fusing step S2 is performed. FIG. 8 is a diagram illustrating a relationship between a position of a straight line SL that connects tips 51a and 51b of discharge electrodes 50a and 50b and the discharge strength in the present embodiment. As illustrated in FIG. 8, in the fusing step S2 of the present embodiment, the discharge strength is favorably maximized at a position where the straight line SL that connects the tips 51a and 51b does not intersect with any of the cores 11 when the end surfaces of the multi-core fibers 2 are planarly viewed, is more favorably maximized at a position where the straight line SL does not intersect with any of the first clads 12, and is further more favorably maximized at a position where the straight line SL does not intersect with any of the second clads 13. Also, other points are similar to the fusing step S2 of the first embodiment.

According to the method of connecting the multi-core fibers 2 of the present embodiment, deformation of a specific second clad 13 or change of the refractive index of a specific second clad 13 can be suppressed by not carrying out the discharge having the maximum strength to the positions where the second clads 13 are arranged. Therefore, dispersion of the confinement effect of light of the cores 11 in a connected portion of the multi-core fibers 2 can be further suppressed.

Figure 9:
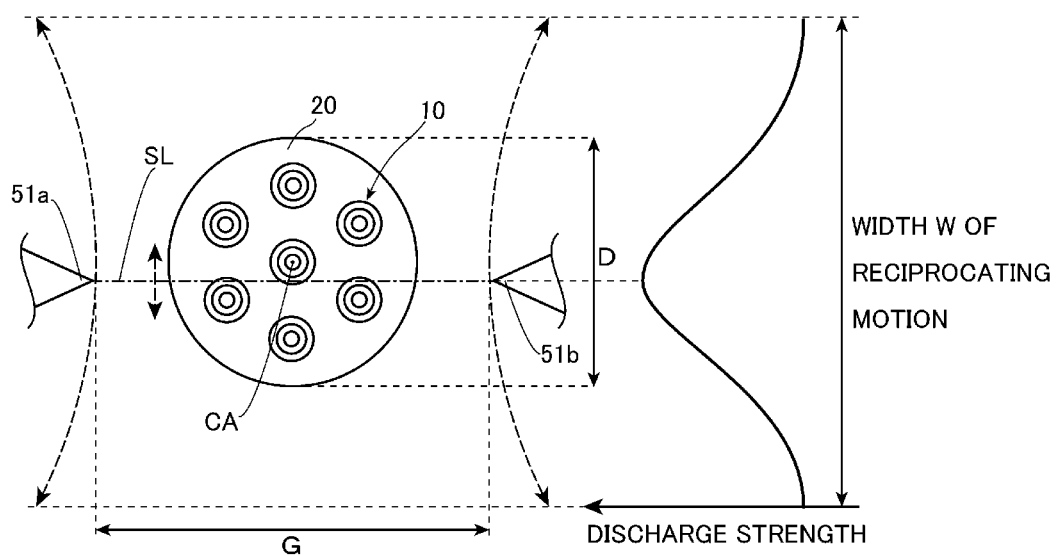
FIG. 9 is a diagram illustrating a modification of the second embodiment.

Note that, in the present embodiment, in the fusing step S2, a pair of multi-core fibers 2 is horizontally arranged such that a pair of core elements 10 at an outer periphery side is horizontally arranged while sandwiching the core element 10 arranged in the center of the clad 20. However, the multi-core fibers 2 may be arranged as follows. FIG. 9 is a diagram illustrating a modification of the second embodiment. As illustrated in FIG. 9, a pair of multi-core fibers 2 is horizontally arranged such that a pair of core elements 10 at an outer periphery side is arranged in a vertical direction while sandwiching the core element 10 arranged in the center of the clad 20. Even in this case, the discharge strength is favorably maximized while the straight line SL that connects the tips 51a and 51b lies at a lower side than the central axes CA of the clads 20 of the multi-core fibers 2, and is more favorably maximized at a position where the straight line SL does not intersect with any of the cores 11 of the multi-core fibers 2 when the end surfaces of the multi-core fibers 2 are planarly viewed. Also, the discharge strength is further more favorably maximized at a position where the straight line SL that connects the tips 51a and 51b does not intersect with any of the first clads 12, and is also further more favorably maximized at a position where the straight line SL does not intersect with any of the second clads 13. In the present modification, to cause the straight line SL not to intersect with the first clads 12 or the second clads 13, the outer diameters of the first clads 12 or the second clads 13 may be made smaller, or the center to center distance between each two of the cores 11 may be made larger.

Also, the multi-core fibers 2 may be rotated and arranged around the central axes CA with other angle as long as the cores 11 of the multi-core fibers 2 face each other. In this way, in even the present embodiment, freedom of setting the relative relationship between the position where the discharge is maximized and the position of each of the cores 11 can be further enhanced by arranging the multi-core fibers 2 around the respective central axes CA with a desired angle in the fusing step S2.

The present invention has been described with the embodiments. However, the present invention is not limited to these embodiments.

For example, although a case of arranging 1 to 6 cores 11 has been exemplarily illustrated in the first and second embodiments, the number of cores or the arrangement of cores has especially no limitation.

Also, in the above-described embodiment, the multi-core fibers 1a and 1b and the pair of discharge electrodes 50a and 50b are horizontally arranged. However, in the present invention, the multi-core fibers 1a and 1b and the pair of discharge electrodes 50a and 50b may not be horizontally arranged as long as the fusion can be performed.

Also, in the above-described embodiment, the tips 51a and 51b of the discharge electrodes 50a and 50b are reciprocated while describing an arc in the vertical direction by the pair of discharge electrodes 50a and 50b repeatedly swinging. However, in the present invention, the tips 51a and 51b of the discharge electrodes 50a and 50b may just move such that the straight line SL moves while describing a surface perpendicular to the central axes CA. Therefore, the reciprocating motion may not be necessary. For example, the tips 51a and 51b may move such that the straight line SL passes through the central axes CA only one time. Further, the tips 51a and 51b of the discharge electrodes 50a and 50b may move, for example, in a linear manner, and in this case, the tips 51a and 51b are linearly reciprocated. Also, the width W of the reciprocating motion of the tips 51a and 51b may be smaller than the diameter of the clad 20.

Also, in the above-described embodiment, the discharge is controlled such that the discharge strength varies in accordance with the positions of the tips 51a and 51b of the discharge electrodes 50a and 50b. However, the discharge strength may be constant. Also, in a case where the discharge strength varies, the position at which the discharge strength is maximized may not be below the central axes CA of the clads 20. Also, the discharge strength may be maximized at a position where the straight line SL that connects the tips 51a and 51b intersects with one of the cores 11 when the end surface of the multi-core fiber 1b is planarly viewed. Also, in the second embodiment, the discharge strength may be maximized at a position where the straight line SL that connects the tips 51a and 51b intersects with one of the second clads 13 when the end surface of the multi-core fiber 1b is planarly viewed.

Examples

Hereinafter, the present invention will be described further in detail with reference to Examples and Comparative Example, but is not limited to Examples.

Example 1

A plurality of multi-core fibers having a similar structure to the second embodiment was prepared, and inner side protective layers and outer side protective layers were peeled off. The multi-core fibers had a clad with the diameter of 181 µm. In each core element, the diameter of a core was 10 µm, the outer diameter of a first clad was 20 µm, the outer diameter of a second clad was 30 µm, and the center to center distance between the cores was 43 µm. Note that the refractive index of the first clad was the same as that of the clad, the relative refractive index difference of the core to the clad was 0.27%,
the relative refractive index difference of the second clad to the clad was −0.75%, and the mode field diameter to the light having a wavelength of 1.55 µm was 12.1 µm.

Next, as a first trial, two multi-core fibers were selected, angles of end surfaces to be fused with respect to surfaces perpendicular to central axes of the clads were measured. Then, these multi-core fibers were horizontally arranged side by side and set in a fusion device, the cores were caused to face each other by aligning the central axes of the clads, and the multi-core fibers were butted against each other. Note that the fusion device has a pair of discharge electrodes, tips of which are horizontally arranged to each other with a 2.0 mm space. When the multi-core fibers were set in the fusion device, the tips of the discharge electrodes were positioned while sandwiching a butted position of the multi-core fibers.

Next, discharge was carried out while the tips of the discharge electrodes were vertically reciprocated, and the multi-core fibers were fused. At this time, the width of the reciprocating motion of the tips of the discharge electrodes was 270 µm, the center of the reciprocating motion was horizontal to the central axes of the clads, and a position where the discharge strength is maximized was 35 µm lower than the center of the reciprocating motion. In this case, the position where the discharge strength is maximized is a position where a straight line that connects the tips of the discharge electrodes intersects with a core when the end surfaces of the multi-core fibers are planarly viewed.

Selection and fusion of multi-core fibers similar to this first trial were further performed as second to fifth trials.

Next, connection losses in each trial were measured. At this time, the light having the wavelength of 1.5 µm was used. Here, an average of the connection losses of cores at the outer periphery side, an average of the connection losses of all cores including a central core, a difference between a maximum connection loss and a minimum connection loss of the cores at the outer periphery side are shown in Table 1 along with the angles of the end surfaces.

TABLE 1

| Trial | Connection loss average [dB] (Cores at outer periphery side) | Connection loss average [dB] (All cores) | Difference between maximum and minimum connection losses [dB] | Angles of end surfaces [Degree] | |
|---|---|---|---|---|---|
| | | | | Left | Right |
| 1 | 0.04 | 0.03 | 0.10 | 0.5 | 0.2 |
| 2 | 0.07 | 0.06 | 0.06 | 0.3 | 0.1 |
| 3 | 0.11 | 0.09 | 0.06 | 0.2 | 0.1 |
| 4 | 0.11 | 0.09 | 0.11 | 0.1 | 0.1 |
| 5 | 0.09 | 0.07 | 0.05 | 0.2 | 0.6 |

Example 2

A plurality of multi-core fibers similar to that in Example 1 was prepared. Then, as a first trial, two multi-core fibers were selected, and angles of end surfaces to be fused with respect to surfaces perpendicular to central axes of clads were measured. Then, the multi-core fibers were fused in a similar manner to Example 1 except that the space between the tips of the discharge electrodes was 2.2 mm. Further, similar selection and fusion of multi-core fibers were performed as a second trial.

Next, connection losses in each trial were measured in a similar manner to Example 1. Here, an average of the connection losses of cores at the outer periphery side, an average of the connection losses of all cores including a central core, a difference between a maximum connection loss and a minimum connection loss of the cores at the outer periphery side are shown in Table 2 along with the angles of the end surfaces.

TABLE 2

| Trial | Connection loss average [dB] (Cores at outer periphery side) | Connection loss average [dB] (All cores) | Difference between maximum and minimum connection losses [dB] | Angles of end surfaces [Degree] | |
|---|---|---|---|---|---|
| | | | | Left | Right |
| 1 | 0.08 | 0.07 | 0.05 | 0.2 | 0.1 |
| 2 | 0.18 | 0.16 | 0.11 | 0.0 | 0.0 |

Example 3

A plurality of multi-core fibers similar to that in Example 1 was prepared except that the diameter of a clad was 195 µm, the center to center distance between cores was 49 µm, the relative refractive index difference of the core to the clad was 0.23%, the relative refractive index difference of a second clad to the clad was −0.88%, and the mode field diameter with respect to the light having the wavelength of 1.55 µm was 11.6 µm, and inner side protective layers and outer side protective layers were peeled off.

Then, as a first trial, two multi-core fibers were selected, angles of end surfaces to be fused with respect to surfaces perpendicular to central axes of the clads were measured, and the multi-core fibers were set in a fusion device having a space between tips of discharge electrodes of 2.1 mm in a similar manner to Example 1. Then, the multi-core fibers were fused in a similar manner to Example 1 except that the width of reciprocating motion of tips of discharge electrodes was 292 µm and the position where the discharge strength is maximized was 56 µm lower than a center of the reciprocating motion. The position where the discharge strength is maximized is a position where a straight line that connects the tips of the discharge electrodes intersects with a second clad but does not intersects with a core when the end surfaces of the multi-core fibers are planarly viewed.

Selection and fusion of multi-core fibers similar to this first trial were further performed as second and third trials.

Next, connection losses in each trial were measured in a similar manner to Example 1. Here, an average of the connection losses of cores at the outer periphery side, an average of the connection losses of all cores including a central core, a difference between a maximum connection loss and a minimum connection loss of the cores at the outer periphery side are shown in Table 3 along with the angle of the end surface.

TABLE 3

| Trial | Connection loss average [dB] (Cores at outer periphery side) | Connection loss average [dB] (All cores) | Difference between maximum and minimum connection losses [dB] | Angles of end surfaces [Degree] | |
|---|---|---|---|---|---|
| | | | | Left | Right |
| 1 | 0.05 | 0.04 | 0.02 | 0.3 | 0.2 |
| 2 | 0.07 | 0.06 | 0.02 | 0.1 | 0.4 |
| 3 | 0.05 | 0.05 | 0.03 | 0.3 | 0.2 |

Example 4

A plurality of multi-core fibers similar to that in Example 3 was prepared. Then, as a first trial, two multi-core fibers were selected, angles of end surfaces to be fused with respect to surfaces perpendicular to central axes of clads were measured, and then, the multi-core fibers were fused in a similar manner to Example 1 except that a position where the discharge strength is maximized was 49 µm lower than a center of reciprocating motion. The position where the discharge strength is maximized is a position where a straight line that connects tips of discharge electrodes intersects with a core when the end surfaces of the multi-core fibers are planarly viewed. Selection and fusion of multi-core fibers similar to this first trial were further performed as second and third trials.

Next, connection losses in each trial were measured in a similar manner to Example 1. Here, an average of the connection losses of cores at the outer periphery side, an average of the connection losses of all cores including a central core, a difference between a maximum connection loss and a minimum connection loss of the cores at the outer periphery side are shown in Table 4 along with the angles of the end surfaces.

TABLE 4

| Trial | Connection loss average [dB] (Cores at outer periphery side) | Connection loss average [dB] (All cores) | Difference between maximum and minimum connection losses [dB] | Angles of end surfaces [Degree] | |
|---|---|---|---|---|---|
| | | | | Left | Right |
| 1 | 0.12 | 0.10 | 0.07 | 0.1 | 0.2 |
| 2 | 0.12 | 0.10 | 0.05 | 0.6 | 0.1 |
| 3 | 0.11 | 0.09 | 0.12 | 0.3 | 0.6 |

Example 5

A plurality of multi-core fibers having twelve core elements similar to the second embodiment was prepared. In these multi-core fibers, each core element was arranged such that the center to center distances between cores arranged next to each other are equal and lines that connect centers of the cores form an approximate equilateral triangle. That is, each core element was arranged such that one center of the core is positioned at each apex of the equilateral triangle, and one center of the core is positioned at a midpoint of each side. The diameter of each core was 10 µm, the outer diameter of a first clad was 17 µm, the outer diameter of a second clad was 38 µm, the center to center distance between cores arranged next to each other was 37 µm, and the outer diameter of a clad was 225 µm. Also, the refractive index of the first clad was the same as that of the clad, the relative refractive index difference of the core to the clad was 0.34%, and the relative refractive index difference of the second clad to the clad was −0.7%. Further, in each core, the mode field diameter with respect to the light having the wavelength of 1.55 µm was 10.1 µm.

Next, as a first trial, when two multi-core fibers were selected and angles of end surfaces to be fused with respect to surfaces perpendicular to central axes of the clads were measured, an angle of an end surface of one multi-core fiber and an angle of an end surface of the other multi-core fiber were both 0.5 degrees or less. Then, the multi-core fibers were set in a fusion device having a space between tips of discharge electrodes of 2.1 mm in a similar manner to Example 1. Then, the multi-core fibers were fused in a similar manner to Example 1 except that the width of reciprocating motion of tips of discharge electrodes was 338 µm and the position where the discharge strength is maximized was 56 μm lower than a center of the reciprocating motion.

Next, connection losses in each trial were measured in a similar manner to Example 1. As a result, an average of the connection losses of all of the twelve cores was 0.11 dB, and a difference between the maximum and minimum connection losses was 0.09 dB.

Comparative Example 1

Selection and fusion of multi-core fibers were performed as first to fifth trials in a similar manner to Example 1 except that a space of tips of discharge electrodes was 1.5 mm, and positions of discharge electrodes were fixed to a position horizontal to central axes of clads.

Next, connection losses in each trial were measured in a similar manner to Example 1. Here, an average of the connection losses of cores at the outer periphery side, an average of the connection losses of all cores including a central core, a difference between a maximum connection loss and a minimum connection loss of the cores at the outer periphery side are shown in Table 5 along with angles of end surfaces.

TABLE 5

| Trial | Connection loss average [dB] (Cores at outer periphery side) | Connection loss average [dB] (All cores) | Difference between maximum and minimum connection losses [dB] | Angles of end surfaces [Degree] | |
|---|---|---|---|---|---|
| | | | | Left | Right |
| 1 | 0.09 | 0.08 | 0.20 | 0.2 | 0.3 |
| 2 | 0.22 | 0.19 | 0.20 | 0.5 | 0.0 |
| 3 | 0.18 | 0.15 | 0.19 | 0.2 | 0.1 |
| 4 | 0.15 | 0.14 | 0.38 | 0.5 | 0.5 |
| 5 | 0.20 | 0.18 | 0.25 | 0.5 | 0.7 |

As is clear from Tables 1 to 5, it was confirmed that the connection losses in Examples 1 to 4 that are of the method of connecting multi-core fibers of the present invention were smaller than that in Comparative Example 1 that is of a conventional method of connecting multi-core fibers. As a result, it was confirmed, according to the method of connecting multi-core fibers of the present invention, that dispersion of the connection losses in cores can be suppressed. Further, it was confirmed, like Example 3, that the dispersion of the connection losses of cores can be further suppressed when the discharge strength is maximized at a position where the line connecting the tips of the discharge electrodes does not intersect with the cores when the end surfaces of the multi-core fibers are planarly viewed. Note that, it can be considered that the dispersion of the connection losses of the cores can be further suppressed when the discharge strength is maximized at a position where the line connecting the tips of the discharge electrodes does not intersect with the second clads when the end surfaces of the multi-core fibers are planarly viewed.

INDUSTRIAL APPLICABILITY

As described above, according to the present invention, a method of connecting multi-core fibers that is capable of suppressing dispersion of connection losses and of connecting a plurality of multi-core fibers is provided, and the method can be favorably used for high-capacity long-distance communication and the like.

The invention claimed is:

1. A method of connecting a pair of multi-core fibers, the method comprising:
   preparing a first multi-core fiber and a second multi-core fiber, the first multi-core fiber including a plurality of first cores and a first common clad surrounding each of the plurality of the first cores, the second multi-core fiber including a plurality of second cores and a second common clad surrounding each of the plurality of the second cores;
   a butting step of butting end surfaces of the first and second multi-core fibers against each other by aligning central axes of the first and second common clads of the multi-core fibers with each other to cause each core of the first multi-core fiber and corresponding each core of the second multi-core fiber to face each other and butt end faces of the first common clad and the second common clad against each other; and
   a fusing step of fusing the first and second multi-core fibers to each other by carrying out discharge by a pair of discharge electrodes disposed perpendicular to the central axes of the first and second clads, sandwiching a butted position of the first and second multi-core fibers and facing each other,
   wherein the fusing step further includes moving respective tips of the pair of discharge electrodes in a plane perpendicular to the central axes of the first and second clads to cause an imaginary straight line connecting the tips of the discharge electrodes to move in the plane perpendicular to the central axes, and wherein the fusing step fuses the first common clad and the second common clad to each other.

2. The method of connecting multi-core fibers according to claim 1, wherein the tips of the discharge electrodes perform reciprocating motion.

3. The method of connecting multi-core fibers according to claim 1, wherein locus of the imaginary straight line covers the end surfaces when the end surfaces of the multi-core fibers are planarly viewed.

4. The method of connecting multi-core fibers according to any one of claims 1 to 3, wherein strength of the discharge varies in accordance with positions of the tips of the pair of discharge electrodes.

5. The method of connecting multi-core fibers according to claim 4, wherein the multi-core fibers are arranged to cause the central axes to be horizontal, and the discharge electrodes are arranged to cause the imaginary straight line to be horizontal, and
   the strength of the discharge is maximized with the tips of the discharge electrodes lying at a lower side than the central axes.

6. The method of connecting multi-core fibers according to claim 4, wherein the strength of the discharge is maximized at a position where the imaginary straight line does not intersect with any of the cores when the end surfaces of the multi-core fibers are planarly viewed.

7. The method of connecting multi-core fibers according to claim 6, wherein each of the multi-core fibers includes:
   a plurality of first clads each surrounding an outer peripheral surface of corresponding one of the cores; and
   a plurality of second clads each surrounding an outer peripheral surface of corresponding one of the first clads and having an outer peripheral surface surrounded by the common clad, and each of the multi-core fibers satisfies all of the following formulas:

$$n_1 > n_2 > n_3$$

$$n_1 > n_4$$

$$n_3 < n_4$$

where refractive index of the cores is $n_1$, refractive index of the first clads is $n_2$, refractive index of the second clads is $n_3$, and refractive index of the common clad is $n_4$, and the strength of the discharge is maximized at a position where the imaginary straight line does not intersect with any of the second clads when the end surfaces of the multi-core fibers are planarly viewed.

8. The method of connecting multi-core fibers according to claim 1, wherein the fusing step moves respective tips of the pair of discharge electrodes by swinging respective discharge electrodes.

9. The method of connecting multi-core fibers according to claim 8, wherein the pair of discharge electrodes swing in synchronization with each other.

10. The method of connecting multi-core fibers according to claim 2, wherein the tips of the discharge electrodes perform reciprocating motion in synchronization with each other.

* * * * *